(12) United States Patent
Ho

(10) Patent No.: US 9,947,025 B2
(45) Date of Patent: Apr. 17, 2018

(54) METHOD AND APPARATUS FOR PROVIDING SEARCH CAPABILITY AND TARGETED ADVERTISING FOR AUDIO, IMAGE, AND VIDEO CONTENT OVER THE INTERNET

(71) Applicant: SAMSUNG ELECTRONICS CO., LTD., Gyeonggi-do (KR)

(72) Inventor: Edwin Ho, Palo Alto, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/989,174

(22) Filed: Jan. 6, 2016

(65) Prior Publication Data

US 2016/0117729 A1 Apr. 28, 2016

Related U.S. Application Data

(63) Continuation of application No. 12/973,737, filed on Dec. 20, 2010, now Pat. No. 9,251,532, which is a continuation of application No. 12/605,796, filed on Oct. 26, 2009, now Pat. No. 7,856,358, which is a continuation of application No. 11/490,798, filed on Jul. 20, 2006, now Pat. No. 7,620,551.

(51) Int. Cl.
*G06F 17/30* (2006.01)
*G06Q 30/02* (2012.01)
*G10L 15/26* (2006.01)

(52) U.S. Cl.
CPC ... *G06Q 30/0256* (2013.01); *G06F 17/30247* (2013.01); *G06F 17/30525* (2013.01); *G06F 17/30746* (2013.01); *G06F 17/30749* (2013.01); *G06F 17/30793* (2013.01); *G06F 17/30796* (2013.01); *G06F 17/30817* (2013.01); *G06F 17/30831* (2013.01); *G06Q 30/02* (2013.01); *G06Q 30/0267* (2013.01); *G10L 15/26* (2013.01)

(58) Field of Classification Search
CPC ... H04N 7/08; G06Q 30/0251; G06Q 30/0256
See application file for complete search history.

(56) References Cited

U.S. PATENT DOCUMENTS

| | | | |
|---|---|---|---|
| 5,729,741 | A | 3/1998 | Liaguno et al. |
| 5,794,249 | A | 8/1998 | Orsolini et al. |
| 6,345,252 | B1 | 2/2002 | Beigi et al. |
| 6,404,856 | B1 | 6/2002 | Wilcox et al. |
| 6,434,520 | B1 | 8/2002 | Kanevsky et al. |

(Continued)

OTHER PUBLICATIONS

Google, "News from Google—Google Launches Self-Service Advertising Program", Press release from http://googlepress.blogspot.com/2000/10/googlelaunchesselfservice.html, Oct. 23, 2000.*

(Continued)

*Primary Examiner* — Brian L Albertalli
(74) *Attorney, Agent, or Firm* — Sughrue Mion, PLLC

(57) ABSTRACT

The present invention provides an apparatus and method for extracting the content of a video, image, and/or audio file or podcast, analyzing the content, and then providing a targeted advertisement, search capability and/or other functionality based on the content of the file or podcast.

20 Claims, 3 Drawing Sheets

(56) References Cited

U.S. PATENT DOCUMENTS

| | | | |
|---|---|---|---|
| 6,698,020 B1* | 2/2004 | Zigmond | H04N 5/44513 348/E5.102 |
| 6,829,646 B1* | 12/2004 | Philyaw | G06F 3/14 709/206 |
| 6,907,397 B2 | 6/2005 | Kryze et al. | |
| 7,283,841 B2 | 10/2007 | Luke et al. | |
| 7,634,407 B2* | 12/2009 | Chelba | G10L 15/26 369/25.01 |
| 7,716,161 B2* | 5/2010 | Dean | G06Q 30/02 705/14.49 |
| 7,769,764 B2 | 8/2010 | Ramer et al. | |
| 7,877,387 B2 | 1/2011 | Hangartner | |
| 8,171,509 B1* | 5/2012 | Girouard | G06Q 30/0241 705/14.4 |
| 9,286,388 B2* | 3/2016 | Marsh | G06F 17/30864 |
| 2002/0038383 A1* | 3/2002 | Ullman | G06F 17/30855 709/245 |
| 2002/0120564 A1* | 8/2002 | Strietzel | G06Q 20/102 705/40 |
| 2003/0050863 A1* | 3/2003 | Radwin | G06Q 30/02 705/26.1 |
| 2003/0074661 A1* | 4/2003 | Krapf | G06Q 30/02 725/34 |
| 2003/0233349 A1* | 12/2003 | Stern | G06F 17/30244 |
| 2004/0006737 A1* | 1/2004 | Colbath | G10L 25/78 715/201 |
| 2004/0045028 A1* | 3/2004 | Harris | H04N 7/17318 725/86 |
| 2004/0049728 A1* | 3/2004 | Langford | G06F 17/30873 715/205 |
| 2006/0036488 A1* | 2/2006 | Golan | G06Q 30/02 705/14.47 |
| 2006/0059440 A1* | 3/2006 | Pry | G06F 17/30864 715/838 |
| 2006/0248209 A1 | 11/2006 | Chiu et al. | |
| 2006/0287988 A1* | 12/2006 | Mason | G06F 17/30737 |
| 2007/0078708 A1 | 4/2007 | Yu et al. | |
| 2007/0078712 A1 | 4/2007 | Ott et al. | |
| 2007/0106760 A1 | 5/2007 | Houh et al. | |
| 2007/0130203 A1* | 6/2007 | Gulli | G06Q 30/02 |
| 2007/0130602 A1* | 6/2007 | Gulli | H04N 7/17318 725/113 |
| 2007/0204310 A1* | 8/2007 | Hua | H04N 7/17318 725/88 |
| 2007/0276726 A1 | 11/2007 | DiMatteo | |
| 2007/0294295 A1* | 12/2007 | Finkelstein | G06F 17/30017 |
| 2008/0002916 A1* | 1/2008 | Vincent | G06K 9/3258 382/305 |
| 2008/0010117 A1* | 1/2008 | Oliveira | G06Q 30/02 705/26.1 |
| 2008/0046320 A1 | 2/2008 | Farkas et al. | |
| 2008/0097915 A1* | 4/2008 | Golan | G06Q 30/0273 705/51 |

OTHER PUBLICATIONS

Google, "Advertising Program", web capture of http://www.google.com/adv/intro.html from https://web.archive.org, captured on Feb. 29, 2000.*

International Search Report, PCT/US07/16451, dated Sep. 17, 2008.

Written Opinion, PCT/US07/16451, dated Sep. 17, 2008.

* cited by examiner

METHOD AND APPARATUS FOR PROVIDING SEARCH CAPABILITY AND TARGETED ADVERTISING FOR AUDIO, IMAGE, AND VIDEO CONTENT OVER THE INTERNET

PRIORITY CLAIM/RELATED APPLICATIONS

This application is a continuation of U.S. patent application Ser. No. 12/973,737 filed on Dec. 20, 2010 and entitled "Method and Apparatus for Providing Search Capability and Targeted Advertising for Audio, Image, and Video Content Over the Internet, which claims priority under 35 USC 120 to U.S. patent application Ser. No. 12/605,796 filed on Oct. 26, 2009 and entitled "Method and Apparatus for Providing Search Capability and Targeted Advertising for Audio, Image, and Video Content Over the Internet," which is a continuation of U.S. patent application Ser. No. 11/490,798 filed on Jul. 20, 2006 and issued on Nov. 17, 2009 as U.S. Pat. No. 7,620,551, and entitled "Method and Apparatus for Providing Search Capability and Targeted Advertising for Audio, Image, and Video Content over the Internet," each of which is incorporated herein in its respective entirety by reference.

FIELD OF THE INVENTION

The present invention relates to extracting and analyzing the content of audio, image, and/or video data associated with Internet downloads, Internet podcasts or other digital distribution channels, producing descriptive data concerning that content, and then performing an action that utilizes the descriptive data, such as providing targeted advertising or a search capability.

BACKGROUND OF THE INVENTION

The Internet is increasingly being populated with audio, image, and video content. Server storage capacity and user bandwidth continues to increase and many websites now contain a wealth of audio, image, and video content, including music, photographs, and movies. Audio and video content can be streamed over the Internet or downloaded by a user. Another popular means of obtaining audio and video content is through the use of "podcasts." This term was coined after Apple Computer, Inc. introduced its iPod™ product. The iPod™ devices, certain cellphone handsets, and other handheld devices are capable of connecting to a server over the Internet to receive podcasts. A podcast is an automatic downloading of audio and/or video content over the Internet, sometimes as part of a subscription to the content. For example, a user can subscribe to a television or radio program through a website and have the television or radio program downloaded automatically when the user connects his or her unit to the network.

In another field, text searching and intelligent search engines for the Internet are widespread. Many search engines (e.g., Google™) allow the user to enter keywords (e.g., "lawnmowers") and the search engine then searches for content based on those keywords by searching for the search terms themselves and/or or by searching for concepts that are related to the search terms. However, in the past, these searches were performed on databases created only from textual data available on the Internet. Audio, image, and video content were not included within these searches, unless they were associated with text that was created by a human being for that content (e.g., a textual title for a photograph).

In another field, advertising over the Internet is widespread. Advertising can be targeted to certain topics in which a user is likely to be interested. For instance, many websites that provide a search engine will send ads to the user based on the content of the search entered by the user. As an example, a user who searches for "lawnmowers" through a search engine might be provided with links to websites offering lawnmowers for sale.

To date, there has been no means for performing searches within audio, image, or video content or providing targeted advertising for audio, image, or video content.

It would be desirable to be able to provide a search capability, indexing capability, and other functionality using a database that includes content extracted from audio, image, and video data. This would have the practical effect of making the content of audio, image, and video content searchable and able to be indexed and categorized for future use.

It would be desirable to be able to provide ads automatically along with particular audio, image, or video content that is related to the subject matter of the content. For example, if a user subscribes to a television program discussing stocks and bonds through a podcast service, it would be useful to be able to automatically provide ads for stock brokers along with the podcast. It further would be desirable to be able to provide such ads at particular times within the podcasts such that the ads are relevant to the content of the podcast at a particular time, such as immediately after a certain word is spoken in the podcast.

SUMMARY OF THE INVENTION

An apparatus and method for extracting the content of the audio, image, and video data, analyzing the content, and then providing a targeted advertisement, search capability, and/or other functionality based on the content is provided. One application of this invention is to provide targeted advertising that is provided in conjunction with audio, image, or video content over the Internet. Another application is to provide a search capability for audio, image, or video content.

One embodiment of the invention involves using a server to receive the audio content of a video or audio file or podcast. The server then performs a speech-to-text conversion on the audio and stores the extracted text in a database, in raw form and/or in various database fields. The server then receives a search inquiry from a network user. A search engine will run a search and will search within a database that includes the extracted audio data, and will provide a link to the audio data if relevant to the search entered. The server also may provide targeted advertising to the user based on the content that was extracted from the audio data, if relevant to the search entered.

Another embodiment of the invention involves using a server to download images or the video content of a video file or podcast. The server then performs image recognition to identify known images (e.g., a photograph of Abraham Lincoln), and stores those images and associated descriptive data in a database. The server then receives a search inquiry from a network user. A search engine will run a search and will search within a database that includes the podcast descriptive data and will provide a link to the image or video podcast if relevant to the search entered. The server also may provide targeted advertising to the user based on the descriptive data associated with the video podcast.

DETAILED DESCRIPTION OF THE PREFERRED EMBODIMENTS

Figure 1:
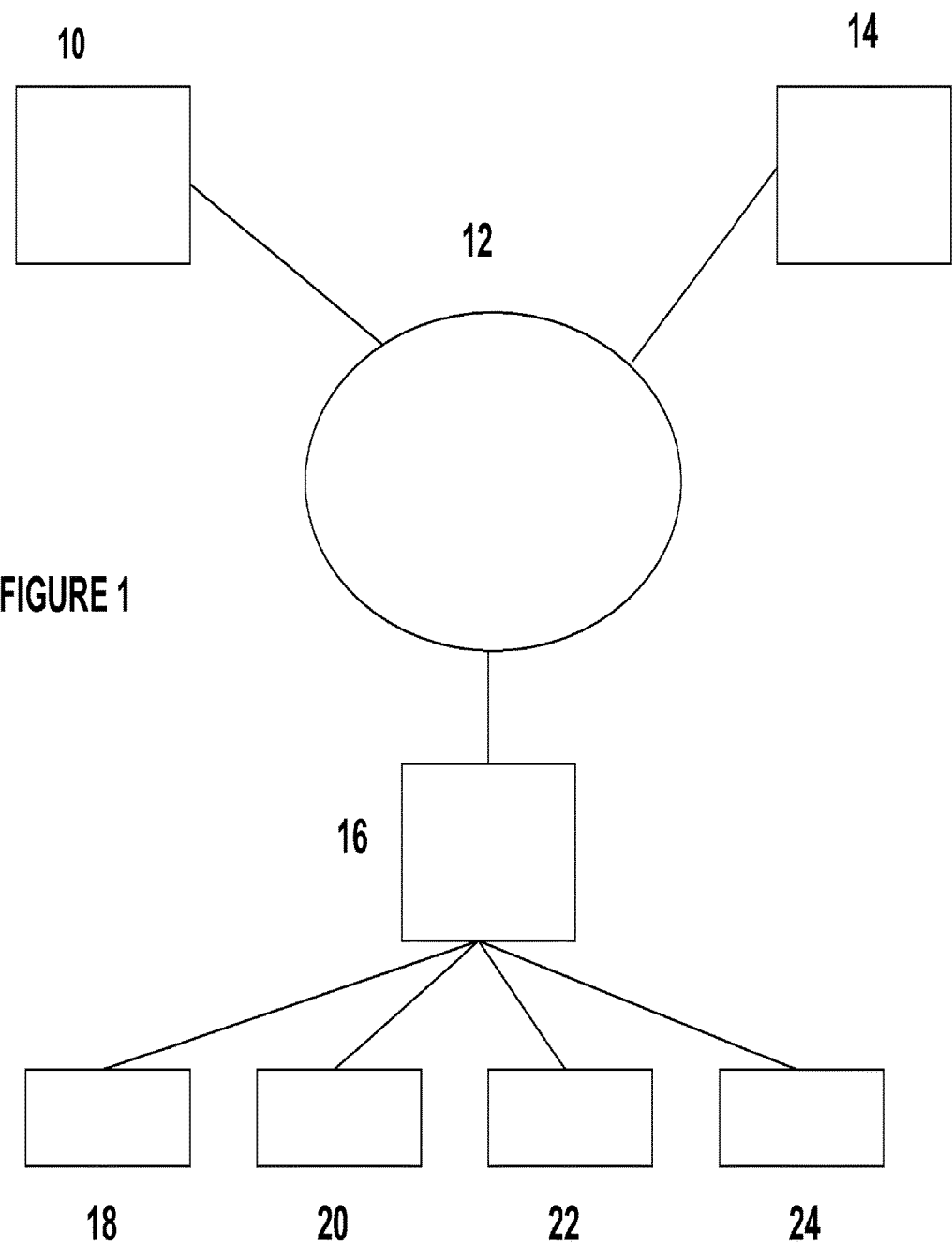
FIG. 1 is a diagram of the basic hardware system used in the preferred embodiment.

Embodiments implementing the present invention are described with reference to FIGS. 1-3. FIG. 1 shows the basic components of the hardware of one embodiment. Typically, a user will operate a computing device 10 to connect to a network 12, such as the Internet. Computing device 10 can be any device with a processor and memory, and includes PCs, laptops, mobile phones, PDAs, servers, etc. Computing device 10 preferably includes a display device and a media player. The connection to network 12 can be through any type of network connection, cellular network, mobile phone network, etc. The network 12 will connect a plurality of users and a plurality of servers and communicate data/content between the servers and the users. In one embodiment, Server A 14 will provide video, image, and/or audio content over the network 12, such as through a podcast or download to other computing devices connected to the network. Server B 16 will be able to access that content through the network 12. Server B 16 can include (or can be coupled to other devices containing) a database 18, storage device 20, search engine 22, and advertising engine 24. The database 18 typically comprises a database software program running on a server or other computer. The storage device 20 typically comprises magnetic or optical storage devices such as hard disk drives, RAID devices, DVD drives, or other storage devices. The storage device 20 typically stores the software run by the server and other associated computers as well as the underlying data and database structures for database 18. The search engine 22 typically comprises a software program running on a server or other computer that is capable of identifying relevant data records in database 18 based on a search request entered on computing device 10 by a user. The advertising engine 24 typically comprises a software program running on a server or other computer that is capable of identifying advertising data that is relevant to the search request entered on computing device 10. Database 18, storage device 20, search engine 22, and advertising engine 24 are well-known in the art and may all be contained on a single server (such as Server B 16) or on multiple servers.

Figure 2:
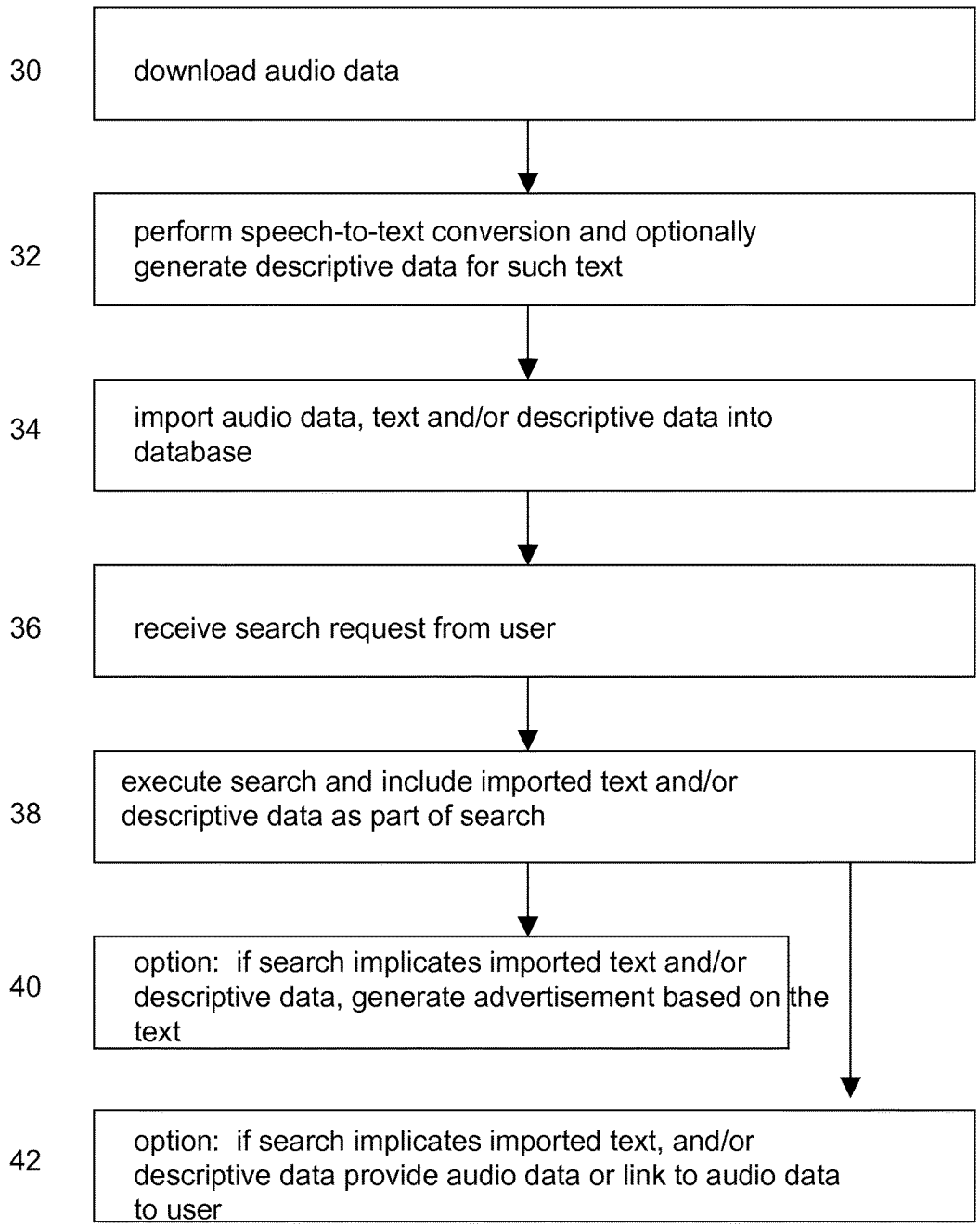
FIG. 2 is a flowchart of the basic method used in one embodiment for extracting text from and creating descriptive data for audio data.

FIG. 2 illustrates an embodiment relating to audio content or to the audio portion of a file or podcast that includes both video and audio. The method illustrated in FIG. 2 is preferably implemented on a server or other computing device. Server B 16 will first download the audio data offered by Server A 14 over the network 12 (step 30). Server B 16 will then automatically process the data, including the step of performing speech-to-text conversion on that audio data and/or creating descriptive data. (step 32). Speech-to-text conversion is well-known in the art. Creating descriptive data involves processing the text data to determine descriptive data that falls within certain predetermined database fields (e.g., a field indicating the general realm of the audio content, such as stock market information or movie news). Such processing essentially creates metadata that describes the content of the audio podcast. For instance, the database could include a field called "genre" that describes the general realm of the content. The entry that is placed into that field would be based on the content itself. As an example, if the extracted textual data includes the words "foreign policy" and "President," then an entry of "politics" could be placed in the genre field. That metadata would then be associated with that particular audio content. In this manner, audio content can be indexed (and later searched). The text, the descriptive data, and/or the audio data are imported into a database. (step 34).

Referring still to FIG. 2, a user will then input a search request (e.g., "lawnmowers") on computing device 10, such as through an Internet search engine run by Server B 16. That request will be received by Server B 16 over network 12 (step 36). Server B 16 and/or search engine 22 will then execute the search within the database 18 that includes the extracted textual data and/or descriptive metadata that previously was generated for the audio data (step 38). If the search implicates the extracted textual data or descriptive metadata, then server B 16 and/or advertising engine 24 optionally: (i) will identify a relevant advertisement based on the descriptive metadata, and that advertisement will be sent to computing device 10 for display (step 40), and/or (ii) will provide the audio data (which it previously obtained from server A 14 and stored) or a link to the audio data stored on server A 14 to the user (step 42). Server B 16 and/or advertising engine 24 optionally can format the advertisement to fit the display and graphics parameters of the display device of computing device 10 prior to transmitting the advertisement to computing device 10.

Figure 3:
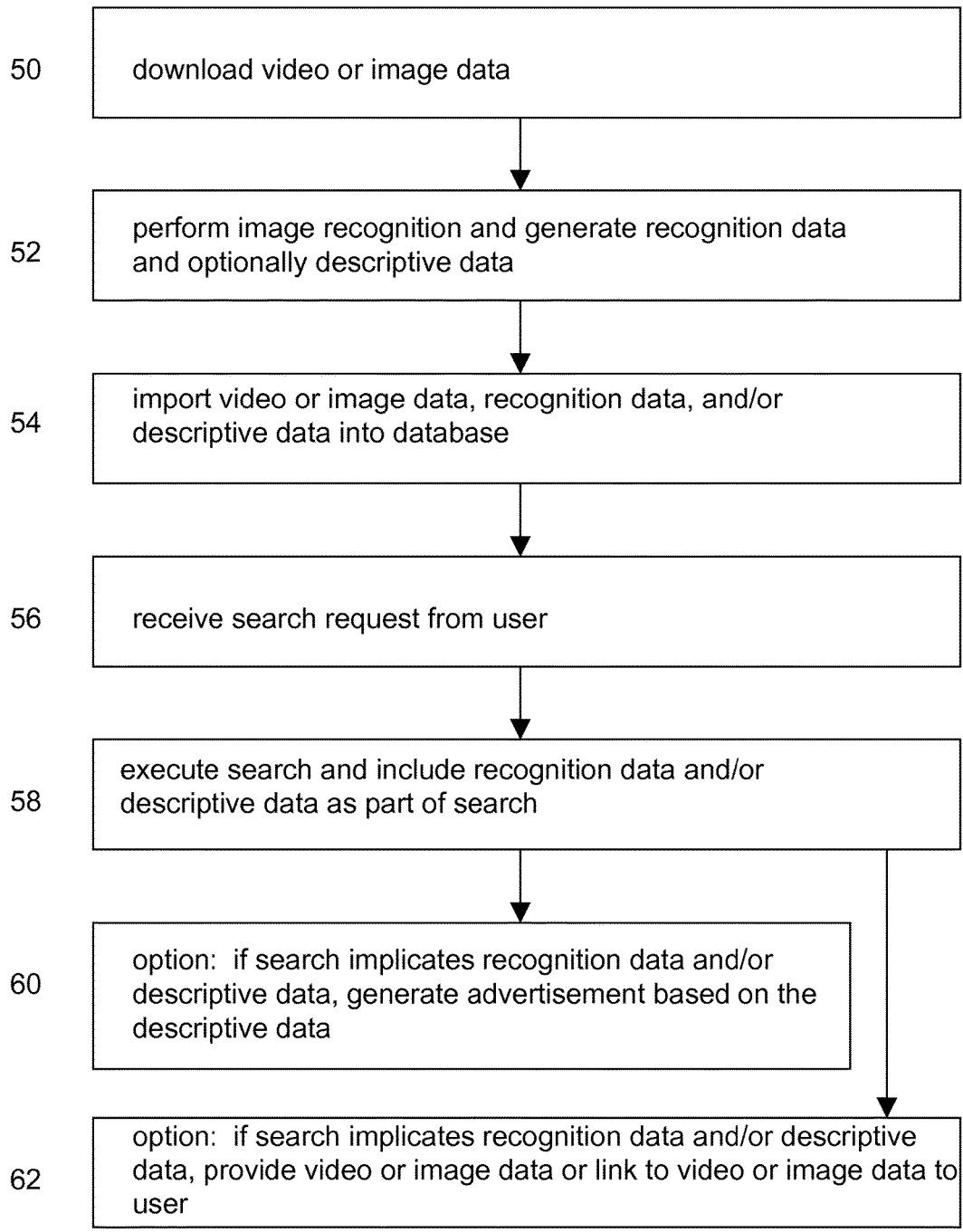
FIG. 3 is a flowchart of the basic method used in another embodiment for creating descriptive data for image data or video data.

FIG. 3 illustrates an embodiment that relates to images, video content, or to the video portion of a file or podcast that includes both video and audio. The method illustrated in FIG. 3 is preferably implemented on a server or other computing device. Server B 16 will first download the image data or video data offered by Server A 14 over the network 12 (step 50). Server B 16 will then automatically process the image data or video data, including the step of performing image recognition on that image or video data. (step 52). Image recognition involves comparing one or more frames of the video data to a set of previously stored, known images, such as images of famous politicians, pop icons, etc. Image recognition is well-known in the art. The step of image recognition will generate recognition data (e.g., the name of a famous politician that shows up in Frame X of the video data) (step 52). Server B will then import the image data, video data and/or the recognition data into database 18. The recognition data can be further processed and the resulting descriptive data and/or the recognition data itself stored in certain database fields (e.g., a field indicating the names of persons who appear in the video) (step 54). Steps 52 and 54 essentially create metadata that describes the content of the image or video data. For instance, the database could include a field called "genre" that describes the general realm of the content. The entry that is placed into that field would be based on the recognition data. As an example, if the recognition data includes "Abraham Lincoln" (because the prior step of image recognition had created that data based on an image in the video data) then an entry of "politics" could be placed in the genre field. The underlying image or video content will then be associated with the recognition data ("Abraham Lincoln") generated as a result of the image recognition step as well as descriptive data ("politics") generated through processing the recognition data. In this manner, video content can be indexed.

Referring again to FIG. 3, a user will then input a search request on computing device 10. That request will be received by Server B 16 over network 12 (step 56). Server B 16 and/or search engine 22 will then execute the search within the database 18 that includes the recognition data and/or descriptive data that previously was created for the video data (step 58). If the search implicates the recognition data and/or descriptive data, then server B 16 and/or advertising engine 24 optionally: (i) will generate an advertisement based on the recognition data and/or descriptive data, and that advertisement will be sent to computing device 10 for display (step 60), and/or (ii) will provide the image or video data (which it previously obtained from server A 14 and stored) or a link to the image or video data stored on server A 14 to the user (step 62).

With both audio and video downloads and podcasts, the timing of the advertisements can be synchronized with the audio and video content after the text data, descriptive data and/or recognition data has been created as discussed above. For example, if it has been determined that a certain video podcast contains a news segment on lawnmowers, an advertisement on lawnmowers can be integrated into the podcast to appear at the very moment when the news segment on lawnmowers begins, or even when the word "lawnmower" is spoken. Thus, after the user downloads the podcast and watches the news segment, the advertisement will appear on his or her screen at precisely the right moment. This is yet another benefit of converting audio, image, and video content into a text form that can be indexed, searched, and analyzed.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. An apparatus comprising:
a communication module; and
a processor configured to:
 transmit, via the communication module, a search request including at least one keyword to an external electronic device;
 in response to the search request, acquire together advertisement content and non-advertisement content from the external electronic device; and
 present, via a display operatively coupled with the processor, the advertisement content in relation with the non-advertisement content,
wherein the non-advertisement content includes video content or image content;
wherein the non-advertisement content and the advertisement content are selected by the external electronic device using a search term including the at least one keyword, and
wherein the advertisement content is integrated into a portion of the non-advertisement content in which the at least one keyword is found.

2. The apparatus of claim 1, wherein the processor is configured to acquire the at least one keyword from a text received as a user input.

3. The apparatus of claim 2, wherein the advertisement content further comprises audio content, video content, or link information corresponding to the keyword.

4. The apparatus of claim 1, wherein the non-advertisement content comprises a plurality of image frames including a first image frame and a second image frame, and wherein the processor is configured to:
 perform the presenting in relation with the first image frame; and
 refrain from performing the presenting in relation with the second image frame.

5. The apparatus of claim 1, wherein the processor is configured to:
 present, via the display, a graphical indicator indicative of a presence of the advertisement content.

6. The apparatus of claim 1, wherein the processor is configured to:
 perform, as at least part of the presenting, a video function or an audio function using a corresponding one of the advertisement content and the non-advertisement content.

7. The apparatus of claim 1, wherein the processor in configured to:
 concurrently perform, as at least part of the presenting, a first function using the advertisement content, and a second function using the non-advertisement content, and
 wherein each of the first function and the second function is one of a video function and an audio function.

8. The apparatus of claim 1, wherein the non-advertisement content is the video content, and wherein, in response to the portion of the non-advertisement content displaying or outputting the keyword, the selected advertisement content is output.

9. An apparatus comprising:
memory to store one or more advertisement contents and one or more non-advertisement contents;
a communication module; and
a processor configured to:
 receive, via the communication module, a search request including at least one keyword from an external electronic device;
 select, via the memory, at least one advertisement content from the one or more advertisement contents, and at least one non-advertisement content from the one or more non-advertisement content, based at least in part on the at least one keyword in the search request; and
 transmit together the at least one advertisement content and the at least one non-advertisement content to the external electronic device as a response to the search request,
wherein the one or more non-advertisement content includes video content, or image content, and
wherein the advertisement content is integrated into a portion of the non-advertisement content in which the at least one keyword is found.

10. The apparatus of claim 9, wherein the processor is configured to:
 select the at least one non-advertisement content based at least in part on meta data corresponding to at least part of the search request.

11. The apparatus of claim 10, wherein the processor is configured to:
 generate the meta data based at least in part on the at least one non-advertisement content; and
 select the at least one non-advertisement content from the one or more non-advertisement contents by comparing the generated meta data to the at least one keyword included in the search request.

12. The apparatus of claim 10, wherein the processor is configured to:
   generate recognition data corresponding to an image object included in the non-advertisement content
   generate the meta data based at least in part on the recognition data; and
   select the at least one non-advertisement content from the one or more non-advertisement contents by comparing the generated meta data to the at least one keyword included in the search request.

13. A method comprising:
   receiving, at an electronic device including a processor and memory storing one or more advertisement contents and one or more non-advertisement contents, a search request including at least one keyword from an external electronic device;
   selecting, using the processor, at least one advertisement content from the one or more advertisement contents, and at least one non-advertisement content from the one or more non-advertisement contents in response to the search request; and
   transmitting together the at least one advertisement content and the at least one non-advertisement content to the external electronic device as a response to the search request,
   wherein the one or more non-advertisement contents comprise video content or image content;
   wherein the selecting of the at least one advertisement content and the at least one non-advertisement content is performed by the external electronic device using a search term including the at least one keyword, and
   wherein the advertisement content is integrated into a portion of the non-advertisement content in which the at least one keyword is found.

14. The method of claim 13, wherein the selecting comprises:
   search the at least one non-advertisement content from the one or more non-advertisement contents based at least in part on meta data corresponding to the at least one keyword included in the search request.

15. The method of claim 13, wherein the selecting comprises:
   generating recognition data corresponding to an image object included in the non-advertisement content;
   generating meta data based at least in part on the recognition data; and
   selecting the at least one non-advertisement content from the one or more non-advertisement contents by comparing the generated meta data to the at least one keyword included in the search request.

16. The method of claim 13, wherein the selecting comprises:
   generating metadata based at least in part on the at least one non-advertisement content; and
   selecting the at least one non-advertisement content from the one or more non-advertisement contents by comparing the generated meta data to the at least one keyword included in the search request.

17. The method of claim 13, wherein the selecting comprises:
   identifying a relevant advertisement content based on descriptive data.

18. The method of claim 13, wherein the transmitting comprises:
   transmitting link information corresponding to a website providing additional information associated with the at least one advertisement content.

19. The method of claim 13, wherein the transmitting comprises formatting the at least one advertisement content as suitable to be displayed at the external electronic device, and
   wherein the non-advertisement content is a video and the integrating of the advertisement content comprises timing the at least one advertisement content to be synchronized with the portion of the at least one non-advertisement content based on relevance between the at least one advertisement content and the at least one non-advertisement content determined at least partially by the keyword.

20. A non-transitory machine-readable storage device storing instructions that, when executed by one or more processors, cause the one or more processors to perform operations comprising:
   transmitting, via a communication module operatively coupled with the processor, a search request including at least one keyword to an external electronic device;
   in response to the search request, receiving together advertisement content and non-advertisement content from the external electronic device; and
   presenting, via a display operatively coupled with the processor, the advertisement content in relation with the non-advertisement content,
   wherein the non-advertisement content including video content, or image content,
   wherein the non-advertisement content and the advertisement content are acquired based on the at least one keyword, and
   wherein the presenting further comprises integrating the advertisement content into a portion of the non-advertisement content in which the at least one keyword is found.

* * * * *